350-3.79 SR

XR 3,904,835

United St[ates Patent]

Matsumoto

[11] 3,904,835

[45] Sept. 9, 1975

[54] RECONSTRUCTION METHOD OF AN OPTICALLY RECORDED SIGNAL

[75] Inventor: Kazuya Matsumoto, Yokohama, Japan

[73] Assignee: Canon Kabushiki Kaisha, Tokyo, Japan

[22] Filed: Dec. 4, 1972

[21] Appl. No.: 311,550

Related U.S. Application Data

[63] Continuation of Ser. No. 97,956, Dec. 14, 1970, abandoned.

[52] U.S. Cl... 179/100.3 G; 178/6.7 A; 350/162 SF

[51] Int. Cl.[2] .......................... G11B 7/00; H04N 5/84

[58] Field of Search........... 178/6.7 A; 179/100.3 G; 250/216, 571, 567; 350/162 SF, 3.5

[56] References Cited

UNITED STATES PATENTS

| | | | |
|---|---|---|---|
| 3,642,349 | 2/1972 | Bestenreiner et al. | 350/162 SF |
| 3,644,019 | 2/1972 | Bestenreiner et al. | 350/162 SF |
| 3,678,472 | 7/1972 | Bass et al. | 179/100.3 G |
| 3,689,692 | 9/1972 | Chung-Sen Ih | 178/6.7 A |

*Primary Examiner*—Stanley M. Urynowicz, Jr.
*Assistant Examiner*—Stewart Levy
*Attorney, Agent, or Firm*—Toren, McGeady and Stanger

[57] ABSTRACT

An arrangement is described for reading out in electrical form a signal manifested as light intensity variations of a carrier frequency along a recording film. The film is illuminated with monochromatic light to diffract the light into a plurality of different order waves. A pair of such different order waves are superposed by interference pattern forming means to generate, at an image plane, a differential fringe pattern containing the spatial intensity variations of the desired signal but not of the carrier. During a longitudinal advance of the film, a photoelectric detector disposed at the image plane detects the intensity variations of the interference fringe pattern to reproduce the desired signal.

11 Claims, 9 Drawing Figures

3904835
OR IN 179/100.3G

FIG. 1a
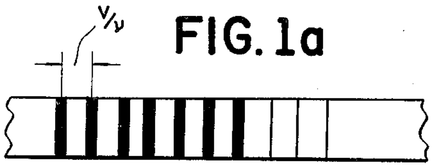
FIG. 1b
FIG. 2
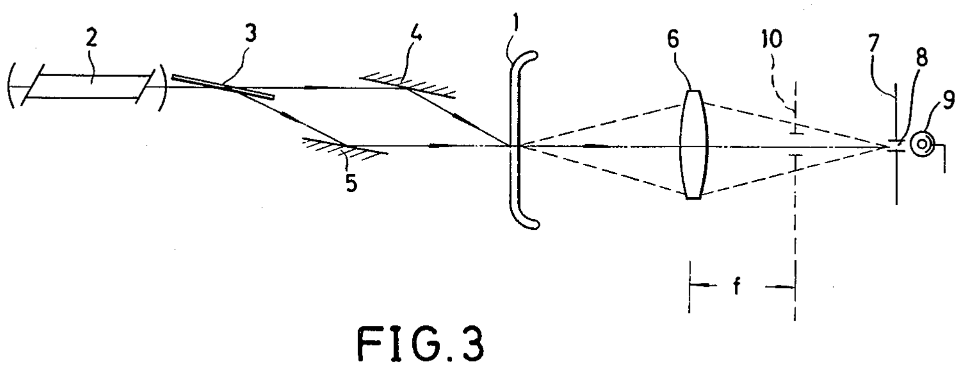
FIG. 3
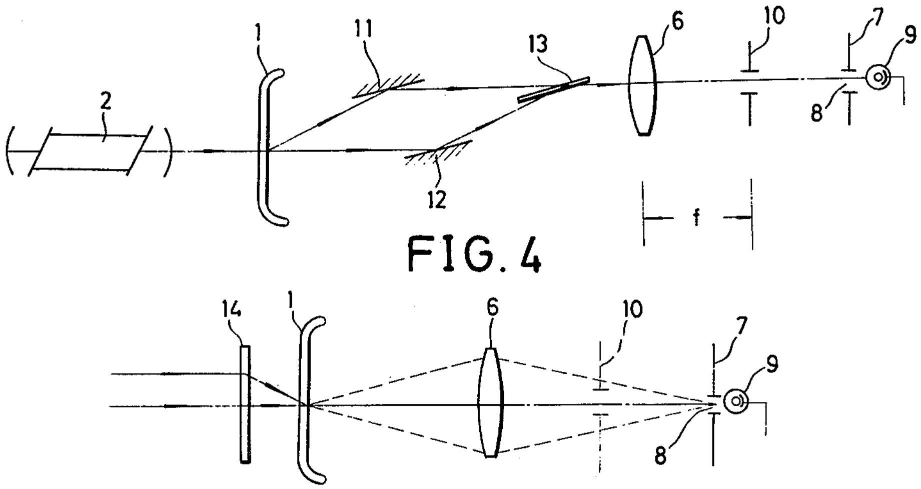
FIG. 4
FIG. 5
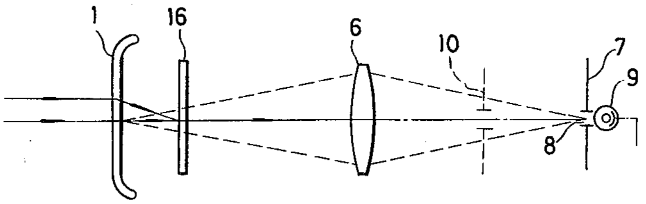
INVENTOR.
KAZUYA MATSUMOTO
BY McGlew and Toren
ATTORNEYS INVENTOR
KAZUYA MATSUMOTO
BY Mc Glew and Toren
ATTORNEYS

RECONSTRUCTION METHOD OF AN OPTICALLY RECORDED SIGNAL

This is a continuation of application Ser. No. 97,956 filed Dec. 14, 1970, now abandoned.

BACKGROUND OF THE INVENTION

The present invention relates to a method and apparatus for reproducing time-varying control signals (such as voice signals for sound tracks) which have been optically recorded on a suitable light-sensitive film, and more particularly for reproducing signals of this type that have been modulated on a higher frequency carrier.

When control signals of this latter type have been optically recorded using, e.g., phase modulation, the resulting recording may exhibit, against the film background, a succession of discrete contrasting strips. The strip spacing deviates from a mean longitudinal distance corresponding to the carrier frequency by increments proportional to the time-varying amplitude of the control signal.

Techniques employing suitable photoelectric converters are known for reproducing the time variations of the original control signal by detecting light intensity variations along the film. However, several disadvantages are present in such known techniques. For example, the resolving power and focusing capability required in the photoelectric detecting system increases with an increase in the density of the recorded information (corresponding to an increase in the carrier frequency) so that, for any given system of this type, increases in the efficiency of optical storage are offset by decreases in the efficiency of its read-out. Additionally, with such conventional systems, scratches and dust on the optical film are interpreted by the detector as variations in light intensity, and leads into errors and noise in the regenerated signal.

SUMMARY OF THE INVENTION

An object of the present invention is to provide, in such systems, an improved arrangement for reproducing an optically recorded siganl whereby such disadvantages are avoided.

In an illustrative embodiment of the invention, a carrier wave phase-modulated by a control signal to be reproduced is recorded on an optical recording device (for example, a light sensitive film) while the film moves longitudinally at a predetermined speed. Such film is sensitized, e.g., with silver salts to exhibit an intensity variation in its longitudinal direction corresponding to the time variations of the control signal.

To read out the recorded control signal, the film is advanced at constant speed and simultaneously illuminated by monochromatic light to produce at the film surface a plurality of diffracted waves. A pair of such diffracted waves of different orders (e.g., the zero order and a first order are superposed by interference pattern forming means. The latter projects the superposed waves on a predetermined reconstruction plane to define a differential fringe pattern having a spatial intensity distribution proportional to the original control signal, while spatial intensity variations attributable to the carrier are eliminated. A photosensitive detector is situated at the reconstruction plane for detecting the resultant fringe pattern simultaneously with the axial advance of the film for generating an output signal having a time variation corresponding to that of the recorded control signal.

The absence of carrier frequency variations in the detected fringe pattern permits the resolving and focusing power of the photoelectric detecting system to be modest even for high recording densities (i.e., high carrier frequencies). In addition, intensity variations caused by scratches and noise on the film surface are distributed randomly over the interference fringe pattern and are not sensed by the detector.

The inventive principle can be exemplified more rigorously as follows. (It will be assumed that phase modulation of the carrier is employed during recording). Let $S(t)$ be a control signal for modulating a carrier wave $\cos\omega ct$. The resultant phase-modulated carrier is given by the following expression:

$$\cos\left\{\omega ct + K_pS(t)\right\} \tag{1}$$

where $K_p$ is a coefficient representing a maximum phase-modulation ratio.

The phase-modulated carrier shown in equation (1) is fed to a Kehr-effect element that serves as an optical modulator, and the light passed through the modulating element is recorded on the film. In this case, when film sensitized with silver salts is used as the recording material, amplitude variations in the modulated wave of equation (1) are recorded as a proportional distribution of the penetration ratio of the film when the film is developed.

When the film is stationary, such penetration ratio distribution may be expressed as:

$$1 + \cos\left\{\omega cX + K_pS(X)\right\} \tag{2}$$

where X represents the dimension in the length-wise direction of the film. If such film is advanced at a constant speed V, the penetration ratio distribution of the film can be expressed as:

$$1 + \cos\left\{\omega c(X-Vt) + K_pS(X-Vt)\right\} \tag{3}$$

If now such moving film is illuminated by a coherent plane wave directed perpendicular to the film axis, a wave front given by the following equation is diffracted from the film:

$$\begin{aligned} &1 + \cos\left\{\omega c(X-Vt) + K_pS(X-Vt)\right\} \\ &= 1 + \tfrac{1}{2}\exp(i\omega_cX)\cdot\exp\left[i\left\{-\omega cVt=K_pS(X-Vt)\right\}\right] \\ &\quad + \tfrac{1}{2}\exp(-i\omega_cX)\cdot\exp\left[i\left\{\omega cVt-K_pS(X-Vt)\right]\right. \end{aligned} \tag{4}$$

The first term on the right side of equation (4) represents a plane wave, and the second and third terms are waves containing the signal S(t). These three waves are respectively propagated in the following angular directions with respect to the normal to the film axis:

$$\theta = 0;\ \theta = \sin^{-1}\frac{\lambda\omega c}{2\pi};\ \theta = -\sin^{-1}\frac{\lambda\omega c}{2\pi}$$

In this case, λ is the wave length of the illuminating plane wave.

The wave front associated with the second term $$\left( \text{i.e., } \theta = \sin^{-1} \frac{\lambda\alpha}{2\pi} \right)$$

has the characteristic of a plane wave which is deformed by the signal S(X−Vt). The distribution of intensity over this wave front is uniform when such front is directly observed so that it is impossible to reconstruct the original signal when a photoelectric amplitude detector is employed. In order to convert such wave front into one having a detectable distribution corresponding to the spatial light intensity distribution of the recorded input signal. Such wave front has its direction of proceeding changed or deflected in to the direction of $\theta = 0$ by interference pattern forming means, so that the wave front is superposed with the plane wave given by the first term of equation (4). As a result these two wave fronts interfere with each other, thus forming fringes. These fringes can be expressed by the following formula:

$$[1 + \exp i \left\{-\omega cVt + K_p S(X - Vt)\right\}] = 2 + 2 \cos\left\{-\omega cVt + K_p S(X - Vt)\right\} \quad (5)$$

It is expressed by this formula that when a photoelectric element is placed at any one point arbitrarily selected in a plane on which the fringes are formed or on which the temporal variation of the light intensity is observed, the original electric signals S ($t$) which has been optically recorded is reconstructed.

The position at which the photo-electric element is placed at this time is called a reconstruction plane.

At the same time, since no carrier frequency space distribution is contained in the formula (5), it will be seen that the distribution of said fringes forms a rougher distribution than the distribution recorded on the film.

Therefore, the degree of resolving power required for the scanning optical system can be reduced and the strictness for adjusting focus can be lessened considerably by scanning at the interference plane rather than by directly scanning at the film surface and thereafter converting into electric signals.

For simplicity of explanation, the recorded intensity distribution along the film is assumed to be sinusoidal. However, in the general case such distribution may take any other form.

When the distribution is not of sine shape as mentioned above, a great number of diffracted waves of high order will be radiated from the optical film.

The orders of the interfering waves can be other than the zero and first orders. For example, a diffracted wave of $m$ order can be expressed by the following formula:

$$\exp(im\omega cx)\cdot\exp\left\{-m\omega cvt + mK_p S(X - Vt)\right\}$$

And when a diffracted wave of $n$ order is superposed with the above diffracted wave in such a manner that the direction of the wave of $n$ order will be the same as that of the wave in number $m$ order, the fringes then can be represented by the following formula:

$$\exp\left\{-(n-m)\omega cvt + (n-m)\, K_p S(X - Vt)\right\} \quad (6)$$

From the above formula, it will be known that electric signals recorded on the film may be reproduced using the higher order diffracted waves in a manner similar to that involving the superposition of the zero and first order diffracted waves.

Other objects, features and advantages of the present invention shall be explained with reference of attached drawings in which:

FIG. 1 $a$ is a simplified drawing to illustrate by way of an example an optical recorded material used for a reconstruction system of the present invention, showing the concentration distribution on the film having no signals but carriers recorded thereon.

FIG. 1 $b$ is a simplified drawing similar to FIG. 1 ($a$) but additionally having modulating signals recorded thereon.

FIG. 2 through FIG. 5 are simplified schematic drawings showing the first to fourth embodiments respectively, in which the reconstruction system of the present invention is embodied.

Figure 6:
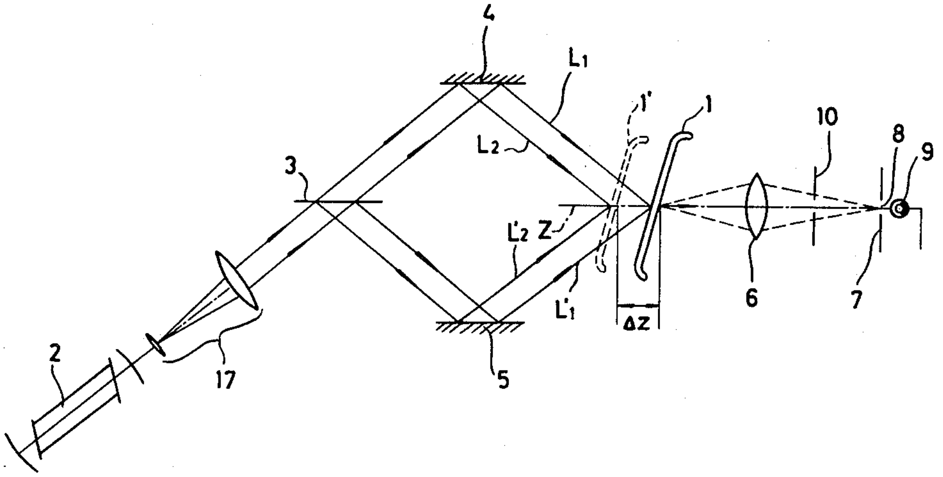
FIG. 6 is a simplified drawing for showing the fifth embodiment of the present invention in which a system to eliminate undesirous effects at the time of transportation or running of the recorded material is embodied.

The first embodiment of the present invention as applied will be explained referring to FIG. 1 and FIG. 2.

FIG. 1 ($a$) is a tape-type film containing an optical record corresponding to an electronic control signal such as a voice signal. It will be assumed that the film is composed of silver salts. As illustrated in FIG. 1 $b$, the distribution of the density in the film 1 defines a pattern of parallel lines slightly deviated from basic pitch (shown in FIG. 1 ($a$)).

This film 1 is made to run at a predetermined speed. In FIG. 2 a laser device 2 serves to supply coherent illumination. And the coherent light beam being radiated from the said laser device will be split into two beams by a beam splitter 3. 4 and 5 are adjusting mirrors to orient the two beams in order to superpose the diffracted light of zero order and the diffracted light of primary order both being diffracted at film 1.

6 is a lens for directing a desired diffracted wave front to a photoelectric element as indicated below. The lens 6 serves to image on a reconstructin plane 7 conjugate to the lens 6 with the plane of the film 1, fringes formed by the interference of diffracted wave of zero order and of the diffracted wave of primary order. An observation pin hole or aperture 8 is provided at an arbitrarily selected point of the reconstruction plane where the fringes appear. A photo-electric conversion element 9 is provided behind the pin hole 8.

By this element 9, the distribution of intensity of the above-mentioned interference fringe may be read so that the original signal may be regenerated. This arrangement is suitable, e.g., for high frequency carrier recording. In such a case where the carrier frequency (and thereby the intensity distribution) recorded on the film 1 is high, the diffraction angle of each diffraction wave is large. Where, however, the intensity distribution is low corresponding to a low carrier frequency, the diffraction angle of each diffracted wavefront is small. In order to correct this problem a diffraction order separation filter 10 may be provided at a focus point of the lens 6.. What is shown as f is the focal length of the lens 6.

In the arrangement shown in FIG. 2, the film 1 is illustrated by two noncoincident light beams so directed that two orders of diffracted waves are radiated in the same direction parallel to the axis of the lens 6. Such waves are imaged by the lens 6 to form the required interference fringe pattern on the reconstruction plane 7. In FIG. 3, the film 1 is illuminated by a single light beam so that different order diffracted beams are propagated in different directions with respect to the lens axis. The diffracted beams of zero order and of first order are redirected by mirrors 11 and 12 and are superposed by a beam splitter 13 to emerge parallel to the lens axis. As before, the superposed beams are imaged by the lens onto the plane 7.

The third and fourth embodiments shown in FIG. 4 and 5 respectively are systems in which a diffraction grating having a pitch equal to the basic pitch of the recorded pattern of the film is used.

In FIG 4, a diffraction grating 14 is provided between the film 1 and the light source or coherent illuminator, and the film 1 is illuminated by the two diffracted light beams being diffracted by the diffraction grating 14.

In the embodiment shown in FIG. 4 a diffraction grating 16 is provided behind the film 1, and the two diffraction light beams being diffracted at the film 1 are superposed in one direction at the diffraction grating 16.

The embodiment shown in FIG. 6 shows a system for eliminating undesirous blurring effects due to transverse flutter of the film generated at the time of running of the film. Such flutter is manifested by a phase difference generated between the diffracted light beam of zero order and the diffracted light beam of primary order. This phase difference, which is proportional to the total flutter $\Delta Z$, enters into the phase portion of the formula (5), causing noises in to the reconstructed signal. Such phase difference may in typical cases be represented by $$\Delta\phi = \frac{2\pi}{\lambda} \cdot \frac{\sin^2\theta}{2} \Delta Z \qquad (7)$$

wherein sin $\theta$ is a diffracted angle of a diffracted ways of primary order. This amount can not be disregarded.

In FIG. 6, 1 is a film, 2 is a light source, 3 is a beam splitter, 4 and 5 are reflective mirrors, and 17 is an optical magnifier system. The film 1 shifts due to flutter in the direction of Z during the time when it is transported with a constant speed. It has been revealed that in order to secure stable output signals at a reconstruction plane even if the film 1 is shifted to the position of 1', two pairs of coherent light beams $L_1$, $L_1'$ or $L_2$, $L_2'$ are received by the film 1 in a symmetric relationship relative to the direction Z, so that these pairs of beams are superposed for example in the direction of Z to form interference fringes for the signal reconstruction. In the drawing, 6 is a lens, 8 is a pin hole, 7 is a reconstruction plane, 9 is a photo-electric tube, 10 is a diaphragm, and by these elements signals unaffected by the shifting of the film in the direction of Z appear at the reconstruction plane 7.

Such flutter-independent signals can be obtained also by radiating coherent light in the direction of Z by reorienting a pair of different order, differently directed diffracted waves from the film 1 to interfere with each other. Diffracted waves of conjugate order (e.g., plus 1 and minus 1 may also be superposed to generate flutter-independent output signals, since such diffracted waves may typically be formed by two incident light beams that are incident on the film symmetrically with respect to the direction Z. In such case, there will be no phase difference generated in the fringes after diffraction.

Figure 7:
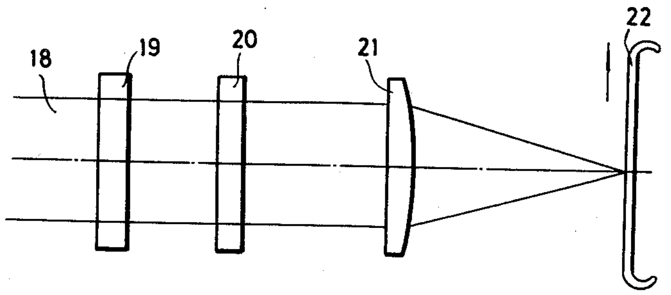
FIG. 7 is a simplified schematic drawing showing the sixth embodiment of the present invention in which a signal recording system according to the present invention is embodied.

FIG. 7 shows an example of signal recording system for obtaining an optically recorded material as shown in FIG. 1. This recording system is most suited for the reconstruction system shown in FIGS. 2 through 6. In FIG. 7, 18 is a luminous flux such as laser beam, 19 is a light chopper (e.g., a shutter) to release and shut the luminous flux 18 intermittently as the means of varying the amount of light, and 20 is a means to deflect light in proportion to the input signal. 21 is an imaging lens and 22 is a film employed as an optical recording material. The film 22 is transported in a direction of an arrow at a constant speed.

If the flux 18 is released and shut intermittently by the shutter 19 with a constant frequency higher than the maximum frequency of the recorded signals, and if the imaging lens 21 is of a cylindrical shape, an intensity distribution of a shape with uniform intervals as shown in FIG. 1 (*a*) will be recorded on the film 22 which moves with a constant speed. The pitch of the intensity distribution shown in FIG. 1(*a*) is related to the exposure cycle $1/v$ of the shutter 19 and the speed V of the film 4, and is expressed by $V/v$. That is, a carrier having spatial frequency of $V/v$ is recorded on the film.

In this case, if recorded signals are applied to the light deflection means 20, the direction of the luminous flux is varied or deflected according to the amplitude variation of the recorded signal and the lined image formed on the film surface will have its position deflected according to such signals. As a result, the distribution of optical signals recorded on the film 22 has a typical intensity distribution as shown in FIG. 1(*b*). The modulation applied by the signal may, for example, be phase, frequency or pulse code modulation.

Figure 8:
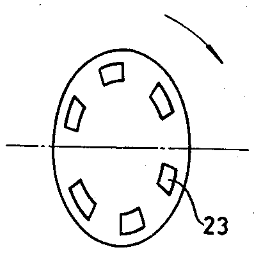
FIG. 8 is a simplified drawing of a light chopping means which may be used in the system shown in FIG. 7.

The light chopping means may also be embodied in other forms, e.g., as a rotating disk with apertures 23 provided therein as shown in FIG. 8, alternately as a shutter employing the Kerr effect or Faraday effect, etc.

The light deflection means may also be embodied in nonmechanical arrangements such as a ultrasonic deflection element, a crystal elment (for example of KDP, ADP, etc.) A mirror which is integral with a moving coil may be also used for this purpose.

What is claimed is:

1. A method of reproducing time variations of a control signal recorded on a recording member in the form of corresponding spaced diffraction grid variations along a predetermined scanning direction, which comprises the steps of:

illuminating a part of said recording member with a monochromatic coherent light beam to propagate a plurality of diffracted waves of different order from the recording member;

advancing the recording member in said scanning direction relative to the monochromatic coherent light beam;

directing a diffracted wave front, which is selected from said plurality of different order diffracted waves, onto a photo-electric surface for making an interference fringe pattern whose spaced fringe may be rougher than said spaced diffraction grid; and detecting the variations in intensity of the interference fringe pattern at the photo-electronic surface while the recording member advances in order to reproduce the time variations of the control signal.

2. A method as defined in claim 1, in which the recording member is an elongated film.

3. A method as defined in claim 1, in which the illuminating step includes projecting a pair of monochromatic light beams against the advancing film at substantially equal angles of incidence relative to a direction normal to the film axis.

4. A method as defined in claim 1, further comprising the step of selecting the zero order diffracted wave and a first order one of the diffracted waves for superposition.

5. A method as defined in claim 1, further comprising the step of selecting a pair of the diffracted waves of conjugate orders for superposition.

6. A method of reproducing time variations of a control signal recorded on a recording member in the form of corresponding spaced diffraction grid variations along a predetermined scanning direction, which comprises the steps of:

illuminating a part of said recording member with a monochromatic coherent light beam to propagate a plurality of diffracted waves of different order from the recording member;

advancing the recording member in said scanning direction relative to the monochromatic coherent light beam;

directing a pair of diffracted wave fronts which are selected from said plurality of different order diffracted waves onto a photo-electronic surface for making an interference fringe pattern whose spaced fringe may be rougher than said spaced diffraction grid; and detecting the variations in intensity of the interference fringe pattern at the photo-electronic surface while the recording member advances in order to reproduce the time variations of the control signal.

7. Apparatus for optically recording an electrical control signal on an elongated film and for reading out the resulting optical record, which comprises;

means for advancing the film longitudinally, means for directing a monochromatic light beam against the film in a direction normal to the film axis to propagate a plurality of different order diffracted waves from the film;

optical modulating means responsive to electrical variations applied to a control input thereof for varying the beam along the axis of the film in proportion to such variations;

means for applying the control signal to the control input of the optical modulating means;

pattern forming means disposed in the paths of certain of the diffracted waves for superposing at least two selected orders of said waves and for generating an interference fringe pattern of the selected orders on a predetermined surface; and photosensitive detecting means disposed at the predetermined surface for sensing variations in intensity of the fringe pattern while the film advances to generate a time-varying output signal.

8. Apparatus for reproducing time variations of a control signal recorded on an elongated film in the form of correspondingly spaced intensity variations along the film, which comprises;

means for advancing the film longitudinally;

means for illuminating the advancing film with monochromatic light to propagate a plurality of diffracted waves of different orders from the film;

pattern forming means disposed in the paths of certain of the diffracted waves for superposing at least two selected orders of said waves and for generating an interference fringe pattern of the selected orders on a predetermined surface; and photosensitive detecting means disposed at the predetermined surface for sensing variations in intensity of the fringe pattern while the film advances to generate a time-varying output signal.

9. Apparatus as defined in claim 8, in which the illuminating means comprises means for directing a pair of monochromatic light beams toward the film at different angles with respect to the normal to the film axis, said angles being chosen so that a pair of different orders of the diffracted waves propagate parallel to the normal.

10. Apparatus as defined in claim 8, in which the illuminating means comprises means for directing a monochromatic light beam toward the film in a direction substantially normal to the film axis, and in which the pattern forming means comprises means for redirecting at least one of the diffracted wave orders so that a pair of such orders propagate parallel to the normal.

11. Apparatus as defined in claim 8, in which the pattern forming means comprises lens means and pin hole means for selecting the desired orders on the predetermined surface.

* * * * *

UNITED STATES PATENT OFFICE

CERTIFICATE OF CORRECTION

Patent No. 3,904,835 Dated September 9,1975

Inventor(s) KAZUYA MATSUMOTO

It is certified that error appears in the above-identified patent and that said Letters Patent are hereby corrected as shown below:

In the heading of the patent, insert

--[30] Foreign Application Priority Data

| | | |
|---|---|---|
| Dec.15,1969 | Japan............... | 44-100736 |
| Dec.19,1969 | Japan............... | 44-102719 |
| March.2,1970 | Japan............... | 45-18082 |

Signed and Sealed this

*twenty-third* Day of *December 1975*

[SEAL]

*Attest:*

RUTH C. MASON
*Attesting Officer*

C. MARSHALL DANN
*Commissioner of Patents and Trademarks*